United States Patent
Arnold et al.

(10) Patent No.: US 7,480,912 B2
(45) Date of Patent: Jan. 20, 2009

(54) METHOD FOR POLICY-BASED, AUTONOMICALLY ALLOCATED STORAGE

(75) Inventors: William C. Arnold, Mahopac, NY (US); David M. Chess, Mohegan Lake, NY (US); Murthy V. Devarakonda, Yorktown Heights, NY (US); Alla Segal, Mount Kisco, NY (US); Ian N. Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 10/449,269

(22) Filed: May 29, 2003

(65) Prior Publication Data

US 2004/0243692 A1 Dec. 2, 2004

(51) Int. Cl.
 G06F 9/46 (2006.01)
 G06F 11/00 (2006.01)
 G06F 12/00 (2006.01)
 G06F 13/00 (2006.01)
 G06F 13/28 (2006.01)
(52) U.S. Cl. .................... 718/104; 711/111; 714/47
(58) Field of Classification Search ................ 709/217; 718/104–105; 370/320; 711/111; 714/47
See application file for complete search history.

(56) References Cited

U.S. PATENT DOCUMENTS 5,978,364 A * 11/1999 Melnik ................. 370/320
6,742,020 B1 * 5/2004 Dimitroff et al. ............ 709/217

* cited by examiner

*Primary Examiner*—Meng-Ai An
*Assistant Examiner*—Eric C Wai
(74) *Attorney, Agent, or Firm*—Scully, Scott, Murphy & Presser, P.C.; Lisa M. Yamonaco (57) ABSTRACT

Methods for allocation of storage resources, performance monitoring, and reallocation of resources to eliminate hot spots, by specifying high-level goals, rather than by means of low-level manual steps. Policies are specified as administrator specified constraints under which the resources are managed. Goals are specified in terms of performance, availability, and security requirements of the desired storage. As a part of the automation, this invention provides a method for analyzing capabilities of the computer storage system and forming analysis results, which are later used for determining an allocation of resources that will meet the high-level goals specified. This invention also provides methods for automatic monitoring of performance, availability, and security goals for allocated resources. If goals are not met, resources are reallocated so that the goals can be met with the allocation. The invention reduces human involvement, allows policy control, minimizes error, and provides efficient service delivery specified by policies.

21 Claims, 9 Drawing Sheets

METHOD FOR POLICY-BASED, AUTONOMICALLY ALLOCATED STORAGE

FIELD OF THE INVENTION

This invention is directed to the field of digital storage systems, computer systems management, and allocation of storage in computer systems. This invention is also directed to the fields of autonomic computing and policy-based management.

BACKGROUND

Storage allocation in information processing systems is a process that involves configuring and initializing data storage devices and mapping parts of the storage areas on those storage devices. Sometimes this is via multiple layers of virtualization, onto storage containers (such as logical volumes or file systems) which can be used by applications. There may be multiple devices involved (such as physical storage media, storage area networks, switches, adapters, and so on) which need to be adjusted and configured to provide the storage containers required by the applications. Modem storage systems include devices that offer a wide range of functions, and that can be configured in a large number of ways. Storage allocation in these systems can be a complex and error-prone process, and reallocation (adjusting the system after some period of operation, to better serve the needs of the storage users) even more so.

In any environment wherein storage allocation is performed, there are a set of policies (explicit and/or implicit) governing the decisions that are made in the allocation process. These policies are often inchoate, embodied only in the actual (and often inconsistent) practices of the people carrying out the allocation. When allocation policies are made explicit, they are usually carried out only approximately, because the complexity of the allocation process makes it impossible for the people doing the allocation to check every decision for conformance to the written policies.

One designer teaches a manual method of allocating storage. Although the teaching is in the context of database management systems, it is understood that the process can be applied for any application (e.g. E-mail) that uses storage. The process involves the following steps: (1) understanding capabilities, configuration, and present commitments of the storage devices; (2) understanding application's data usage requirements; (3) learning resource allocation policies; (4) determining an effective layout for data using an appropriate strategy, under the constraints of policies that apply; and (5) implementing the layout using relevant system commands. The designer also teaches that once the initial data layout has been carried out, the allocated storage must be monitored manually using tools provided by the vendor, on a continuous basis to make sure that the desired performance goals are met. If there is a chronic failure to meet expected performance goals, then reallocation of storage must be done. The entire process is manual, and policies are not documented or documentable in a machine readable form. Therefore, this methodology requires significant skills on the part of the human administrator, careful bookkeeping of many details, and even then the process is often slow, costly, and error prone.

Another designer teaches a software-based approach to storage allocation. A software tool, when provided with a set of performance metrics describing the application storage needs, runs a series of algorithms and then recommends a storage allocation scheme that meets the performance metrics. While this approach provides an automated way for determining data layout, the remaining process is manual. Furthermore, the algorithms used for determining data layout do not separate policies from the optimization process. This teaching describes a static approach in which the automation software does not respond to real time changes in the storage requirements.

What is needed is an autonomic approach supporting explicitly stated policies: the storage allocation steps should be fully automated, the storage system should react to real time changes, and it should be possible to specify, explicitly, policies used in this automation.

SUMMARY OF THE INVENTION

The present invention provides methods for autonomically allocating an reallocating storage, based on policy constraints. This invention automates the steps involved in storage allocation, requiring only a specification of performance, availability, and security requirements of the desired storage, and policy constraints that should be applied. This invention provides automatic monitoring of performance, availability, and security goals, and reallocation of resources if the goals are not met so that the goals can be met with the reallocation. A clear advantage of the invention is that it reduces human involvement in details, allows policy control, is not error prone, is efficient in the use of resources, and delivers services as specified by policies and agreements.

One aspect of the invention is to automate steps involved in storage allocation, that employ only a specification of performance, availability, and security requirements of the desired storage and policy constraints that should be applied.

Another aspect of the invention is to provide automatic monitoring of performance, availability, and security goals, under policy control, while the allocated storage is being used to assure that the allocated storage meets these goals, and to generate an alert if the goals are not being met.

Still another aspect of the invention is to reallocate storage in response to generated alerts that indicate failure to meet quality of service, performance, availability, and security goals.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

The present invention provides storage allocation under control based on higher level performance, availability, and security goals (rather than by means of low-level manual steps), monitors service delivery of the allocated storage, and reallocates storage if service goals are not being met, carried out under policy control.

Figure 1:
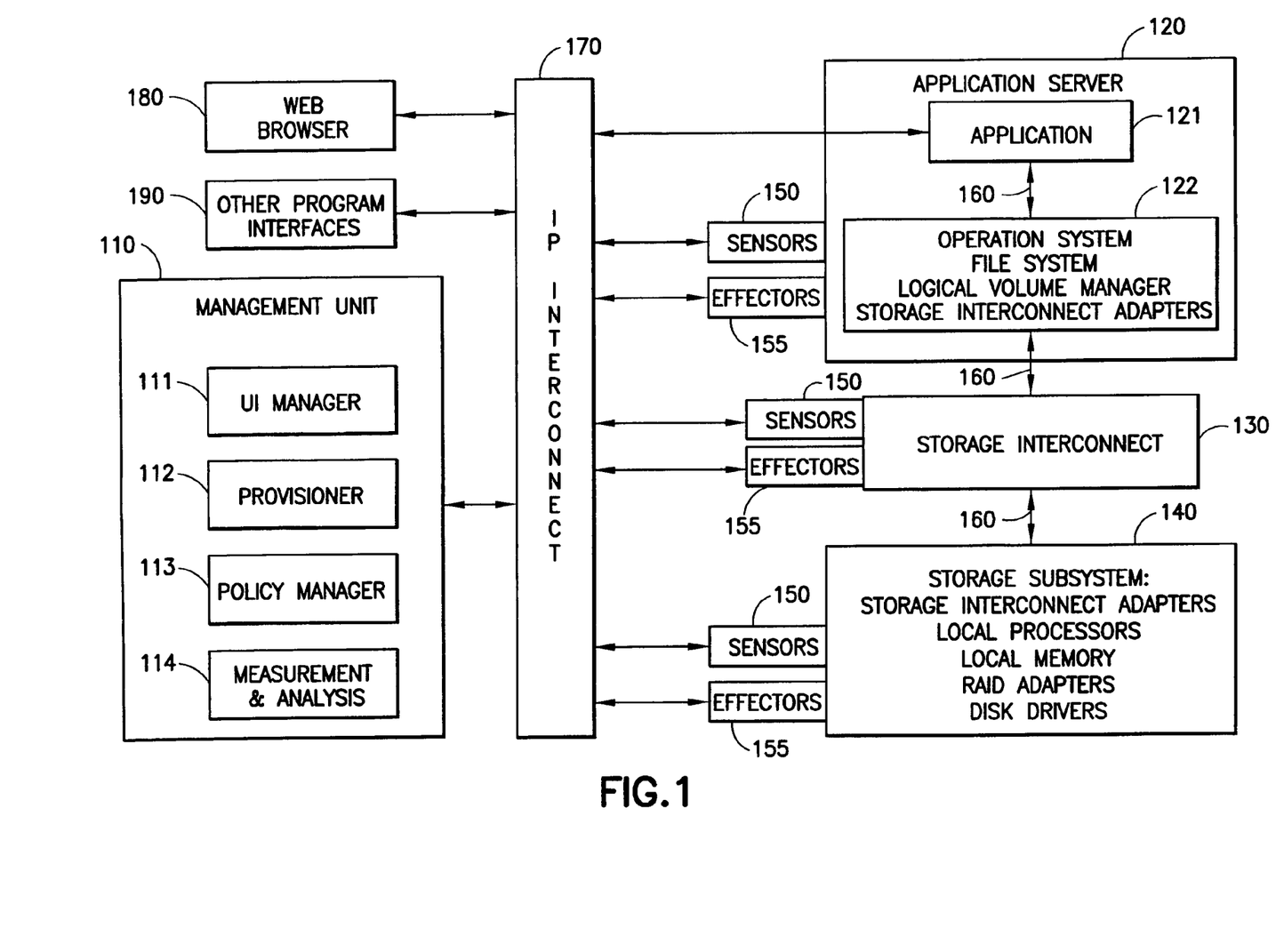
FIG. 1 shows an example of a schematic of the system that provides policy-based, autonomically allocated storage.

FIG. 1 shows an advantageous embodiment of this invention. It consists of one or more application servers 120, which are connected to one or more storage subsystems 140, via one or more storage interconnect elements 130 such as a fibre-channel storage area network. These components are also networked with the management unit 110 through a general purpose network 170 such as a TCP/IP Ethernet. Human administrators interface with the policy-based autonomic storage allocation system using a standard web browser 180 such as Microsoft Internet Explorer version 5.5. In other embodiments of this invention, human administrators interface with the system using a dedicated application program or a centralized administrative console instead of or as well as the web browser 180.

Server 120 runs a storage-using application (e.g. a commercial database management system such as DB2) 121 and a part of the overall storage infrastructure 122. This part of the storage infrastructure 122 includes operating system services for data access, one or more file systems, a logical volume manager, storage interconnect adapters and drivers. The remaining storage infrastructure is provided by the storage interconnect 130, and one more storage subsystems 140. A typical storage subsystem 140 includes storage interconnect adapters and drivers, local processors, local memory, RAID adapters, and disk drives. Data flow 160 takes place between storage-using application 121 and the storage infrastructure.

In this embodiment, the management unit 110 includes a user-interface (UI) manager 111, a provisioner component 112, a policy manager 113, and a measurement and analysis component 114. The management unit 110 obtains the configuration information and usage metrics from the storage infrastructure using sensor components 150, one for each of the levels of the storage infrastructure as shown in FIG. 1. The management unit 110 uses effector components 155 to execute commands and functions that it deems appropriate. The sensor and effector components may run on the storage infrastructure hardware or may run on a separate server system.

A standard web browser 180 is used for human administrators to interact with the management unit for various purposes including specification of policies, to request allocation of storage, visualization of allocated storage and its usage. FIG. 1 also shows that the storage-using application 121 interfaces with the management unit 110 through IP interconnect 170 for storage allocation requests and for storage performance metrics feedback. An additional program interface 190 is also provided so that software, other than the storage-using application and a web browser, can interface with this system for policy specification, storage allocation requests, and for obtaining performance metrics.

For the purposes of this invention, a policy is defined as a rule that defines a choice in the behavior of a system. In many cases, a policy consists of a conditional part and an action part. When the conditional part is evaluated to a Boolean value true, the action part is executed. Furthermore, a policy states constraints under which the storage system should operate, therefore, as used herein a policy includes a set of constraints. Example policies include: (1) For customerA, applicationDB, and logTableSpaces, use service class Gold; (2) For Gold storage, notify if throughput falls below 25% of the value specified in a service class definition.

Also for the purposes of this invention, a service class (abbreviated as a class in this discussion) is defined as an abstraction that comprises at least one of performance, availability, space requirements, and security requirements of a storage-using application. Performance requirements comprise at least one of: throughput, response time, and transfer rate. Availability requirements comprise at least one of: storage system up time and error rate. Space requirements comprise at least one of: maximum size, initial size, size increments, and guaranteed size. Security requirements include: a physical location of the storage; who is authorized to access data, and who is authorized is to request new storage or change an existing storage allocation.

Figure 2:
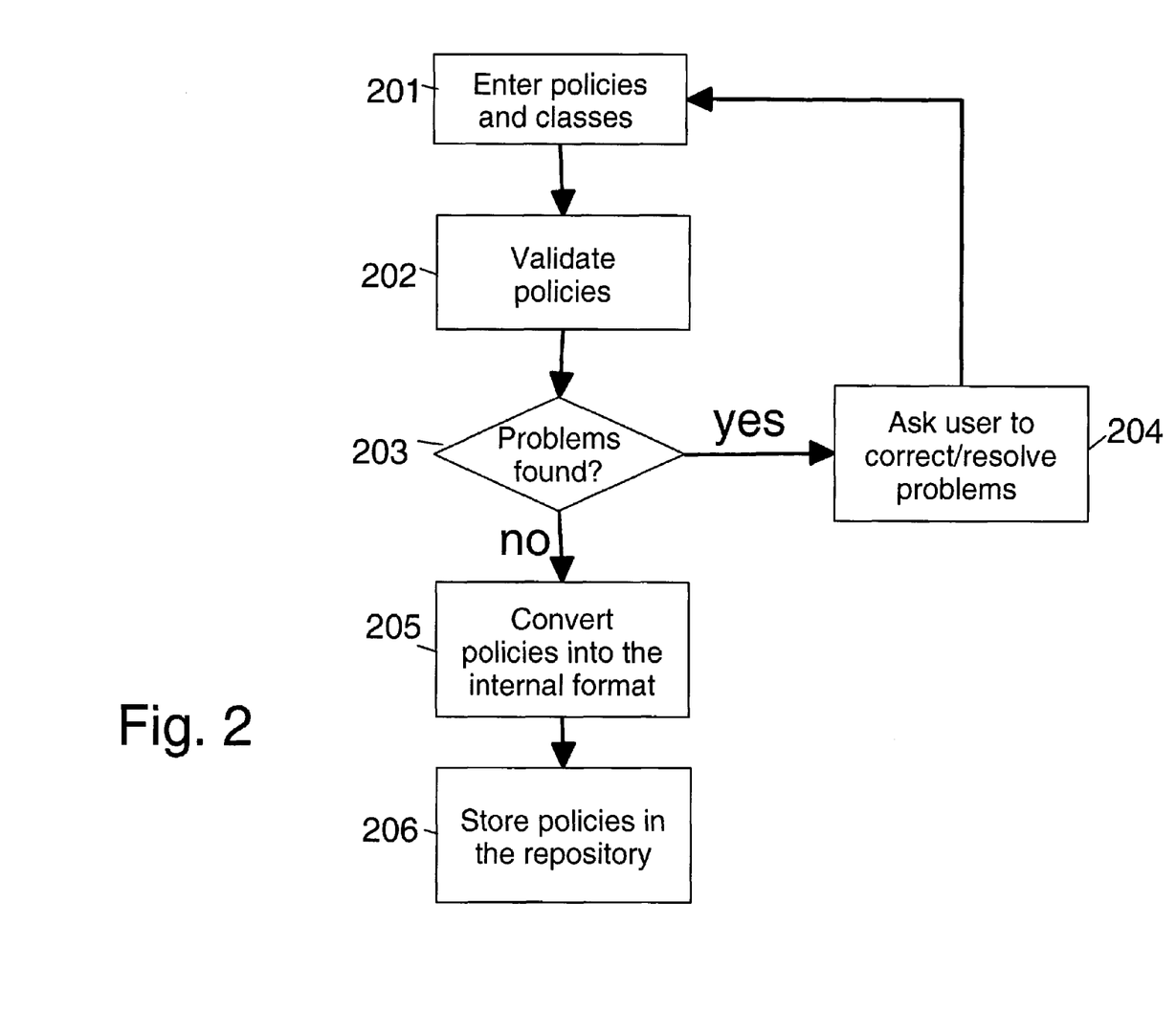
FIG. 2 shows an example of control flow for class and policy specification.

FIG. 2 shows an advantageous embodiment for class and policy specification. In this embodiment, the classes and policies are entered by the user via User Interface (UI) 201 and validated for errors and obvious conflicts 202. If the problems are found the user is asked to fix them 204, and to reenter the policies. This step may also involve prioritizing the policies in case of conflicts. If there are no errors, the policies are converted into an internal format 205, and they are stored in the policy repository 206. In this embodiment, the policies are represented in XML and stored as XML documents, but other possible representations will be evident to those skilled in the art.

In other embodiments of this invention, service classes are not used, and each individual request, (as described below), explicitly lists the performance, availability, space, and/or security requirements for the storage being requested.

In some other embodiments of this invention, policies and service classes are passed from programs in a standardized format (e.g. using XML), without using the UI and/or without human involvement.

Figure 3:
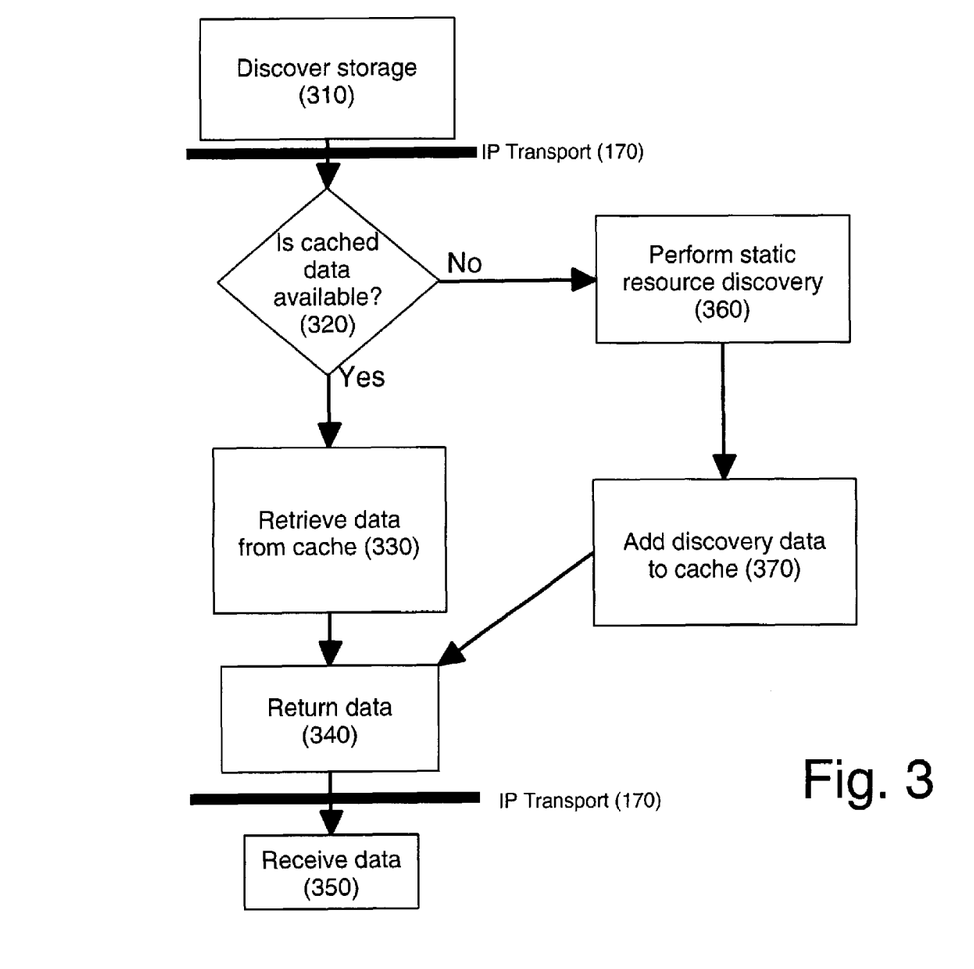
FIG. 3 shows an example of control flow for resource analysis.

FIG. 3 illustrates a control flow when the management unit 110 requests a static resource analysis from the sensors 150. In the case of resource analyses, the sensors are invoked, and the effectors are not involved.

The flow commences when the management unit 110 determines that it requires 310 a static resource analysis. It communicates (via the IP transport 170) with the sensors 150, requesting that static resource analysis. The sensors 150 examine the request, and check 320 to see if a pre-cached copy of the response is available. If a pre-cached copy is available, the sensors retrieve 330 it from the cache, and prepares to return 340 it to the requester.

If a pre-cached copy of the response is not available, the sensor proceeds to perform 360 the static resource analysis. Once this is done, it adds 370 the newly-discovered data to the cache, and prepares to return 340 it to the requester. Once data is ready to return 340, the sensors transmit the data (again over the IP transport 170) to the requester. The requester then receives 350 the data and treats it as a response to its original request.

Figure 4:
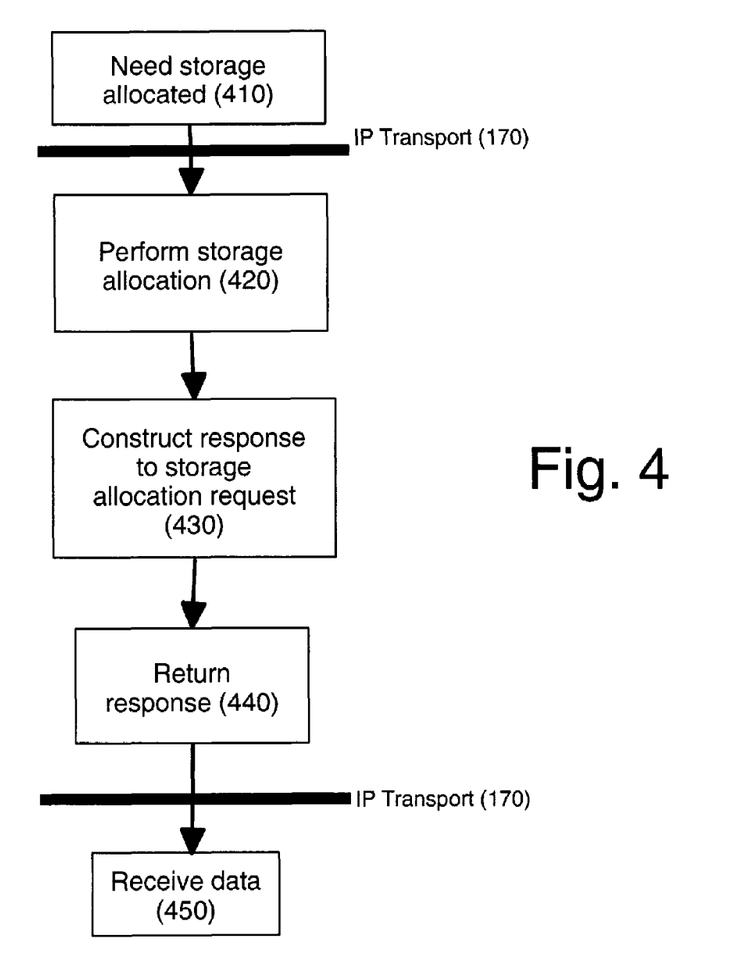
FIG. 4 shows an example of control flow for allocation of storage.

FIG. 4 illustrates a control flow when a component requests that storage be allocated. The flow commences when the management unit 110 determines that it requires new storage to be allocated. The management unit communicates (via the IP transport 170) with the effectors 155, describing the operations necessary to carry out the storage allocation.

In this embodiment, it should be noted that the effectors 155 are not expected to determine how best to meet the storage allocation request. Instead, the management unit 110 tells the effectors 155 precisely how to create the storage required. Other embodiments may choose to split this work differently, perhaps by giving more decision-making authority to the effectors 155 when it comes to determining how to allocate the requested storage.

When the effectors 155 receive the request, they decode it, and proceed to perform 420 the requested storage allocation operations. Once these are complete, the effectors 155 examines the results of those allocation operations, and constructs 430 a suitable response to the requester. This response 430 is then sent 440 (again over the IP transport 170) to the requester. The requester then receives 450 the data, and treats it as a response to its original request.

Figure 5A:
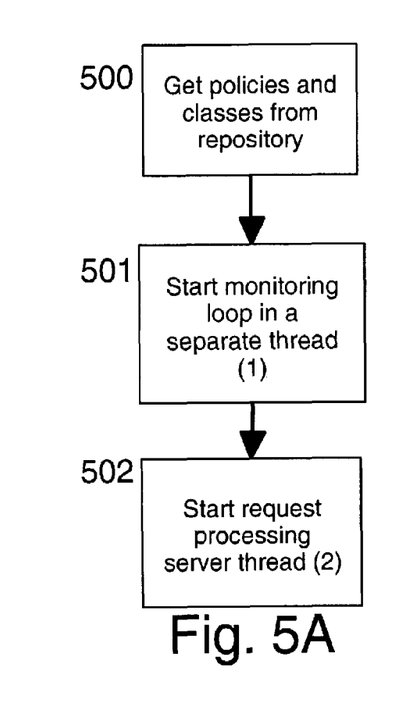
FIG. 5 shows an example of control flow for policy manager.

FIG. 5A shows the flow of control for the policy manager. The policy manager gets the existing policies and classes from the repository 500 when it starts and also whenever new policies are created or existing policies are modified. Those skilled in the art may optimize this aspect by selecting only those policies that are relevant to storage allocation management, as the repository may contain significantly large and diverse policies.

In one embodiment, the policy manager executes policy rules in two modes: a monitoring mode and a request-response mode. In step 501, a separate thread of execution is started to implement the monitoring mode. The monitoring mode policies are used to monitor occurrence of or maintenance of certain conditions over time. For example, they are used to ensure that performance delivered by the system for an allocated storage meets the constraints specified in the relevant policies and service classes. The request processing server thread started in step 502 evaluates request-response mode policies, which are typically invoked to obtain an answer to a query. They are typically used during the resource allocation step to determine the type of storage that is to be used for the resource allocation.

Figure 5B:
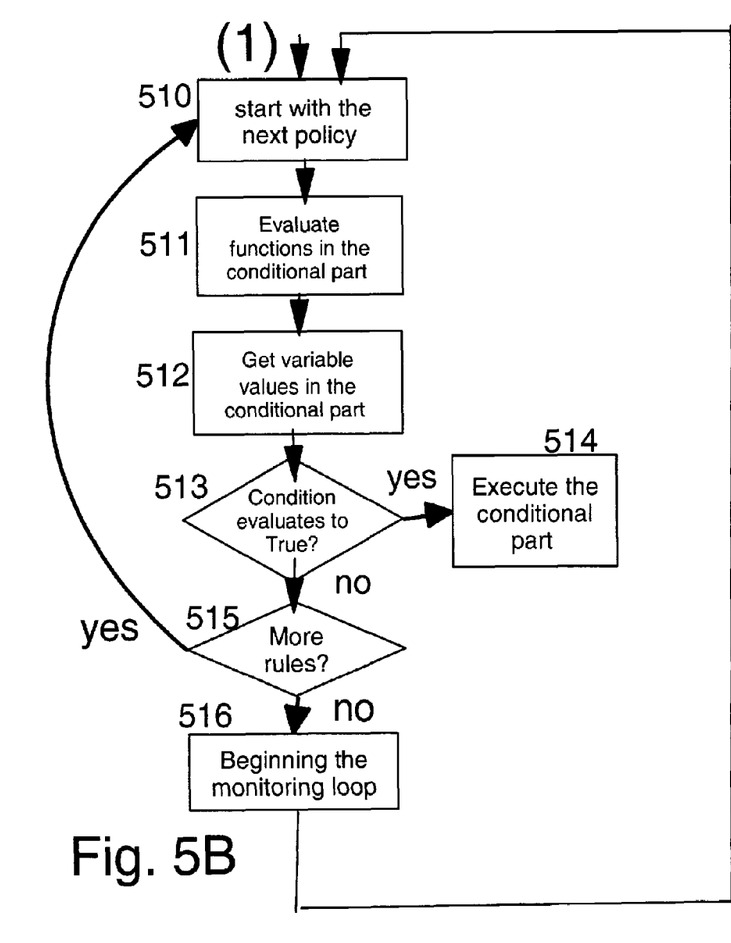

FIG. 5B shows details of a policy rule execution in the monitoring mode. Inside the monitoring loop, the policy manager gets the next policy (510); evaluates any functions in the conditional part of the policy thus substituting the return value of the functions in the place of function specifications (511); obtains values of the variables referenced in the conditional part of the policy thus substituting their values in the place of the variable references (512); and evaluates the conditional part of the policy rule with the substituted values (513). If the condition evaluates to a Boolean value false, the execution continues with the next policy (515). If the condition evaluates to a Boolean value true, the action part of the policy rule is executed (514). After all the rules are executed, the rule execution is restarted again with the first policy in the set (516). This is advantageously done after waiting for a period ranging from a few seconds (e.g. less tan 3 seconds) to more than 10 minutes.

Figure 5C:
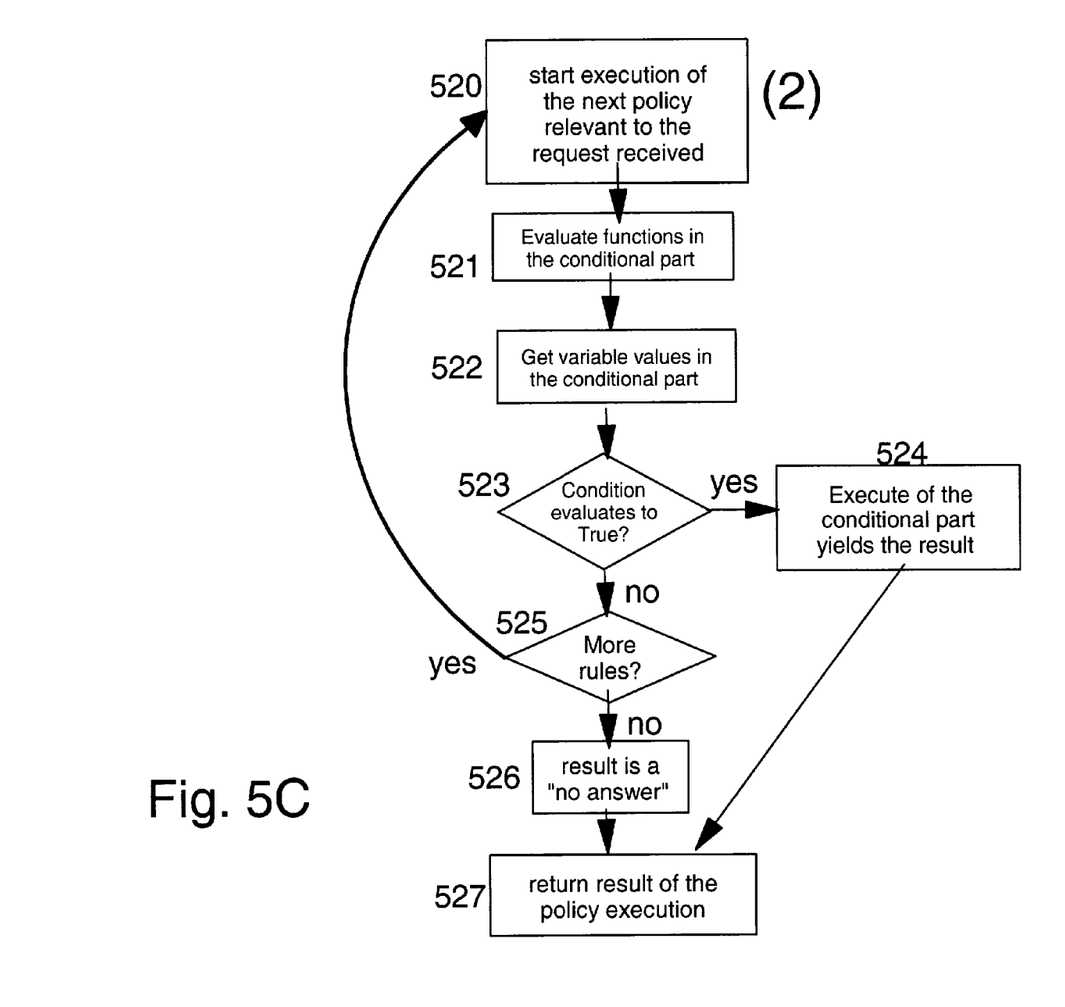

FIG. 5C shows the flow of control within a request processing server started in step 502, FIG. 5A. The request processing server receives a request and starts execution of a next relevant policy 520. In this embodiment the selection of relevant policies is based on certain identification tags on the policies. Execution of the policy takes place in steps 521 through 525, in a manner similar to steps 511 through 515 described in the previous paragraph. If the conditional part evaluates to a Boolean value true then the execution of the policy action part yields (524) a result that can be returned in step 527. If not, a test is made to see if there are any more relevant rules for this request (525), if so the control jumps to step 520 and the execution of a next relevant policy takes place. Otherwise, it is deemed that there is no applicable policy that can provide a response for the request 526, and a code indicating "no answer" is returned as the response 527.

Figure 6:
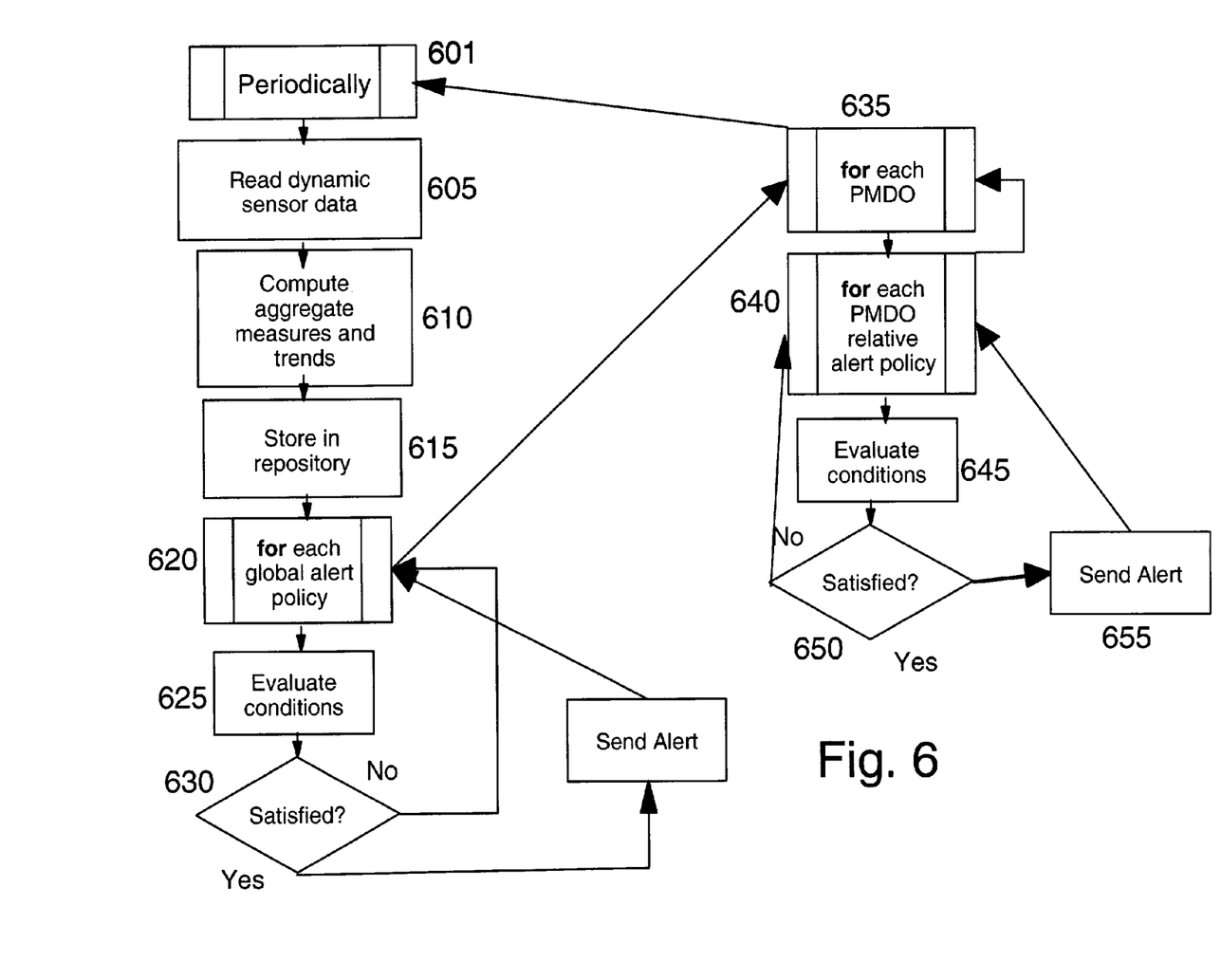
FIG. 6 shows an example of control flow for measurement and analysis for possible reallocation.

FIG. 6 illustrates an example of a logical flow of the measurement and analysis step of an advantageous embodiment of this invention. Periodically (601), [at times ranging from a few seconds (e.g. less tan 3 seconds) to more than 10 minutes,] generally in response to a timer or other trigger, the system reads (605) data from the dynamic sensors, reflecting recent performance of the storage objects allocated in the allocation step, and computes (610) one or more aggregate measures of performance (such as time-averages, means of various kinds, or trend predictions), and stores (615) at least some of the sensed or computed data in a repository for later use. Then, for each alert policy specified in the policy specification phase which is applied only once per cycle (620) the system evaluates (625) the conditions of the policy against the sensed and/or computed performance data, and tests (630) whether the condition of that policy is satisfied. If it is, an alert is sent (632) as specified in the action part of the policy. Once each of these policies has been evaluated in the loop (620), the system loops (635) through each currently-allocated storage container, and for each such container it loops (640) through those policies which are to be applied once per container per cycle. For each of these policies, the system evaluates (645) the condition part of the policy against the currently-considered container and the sensed and/or calculated performance data, and tests (650) whether or not the condition is satisfied. If it is, the appropriate alert is sent (655). When all appropriate policies have been evaluated against all containers, the system waits for the next periodic trigger to start the process again (601), and the period may vary from a few seconds (e.g. less tan 3 seconds) to more than 10 minutes.

Here, alert policy execution based on measurement and analysis is described as an example of the policy manager functions described in FIG. 5A. Those skilled in the art can use the measurement and analysis steps as well as the policy manager functions for other purposes such as for monitoring of availability requirements.

Figure 7:
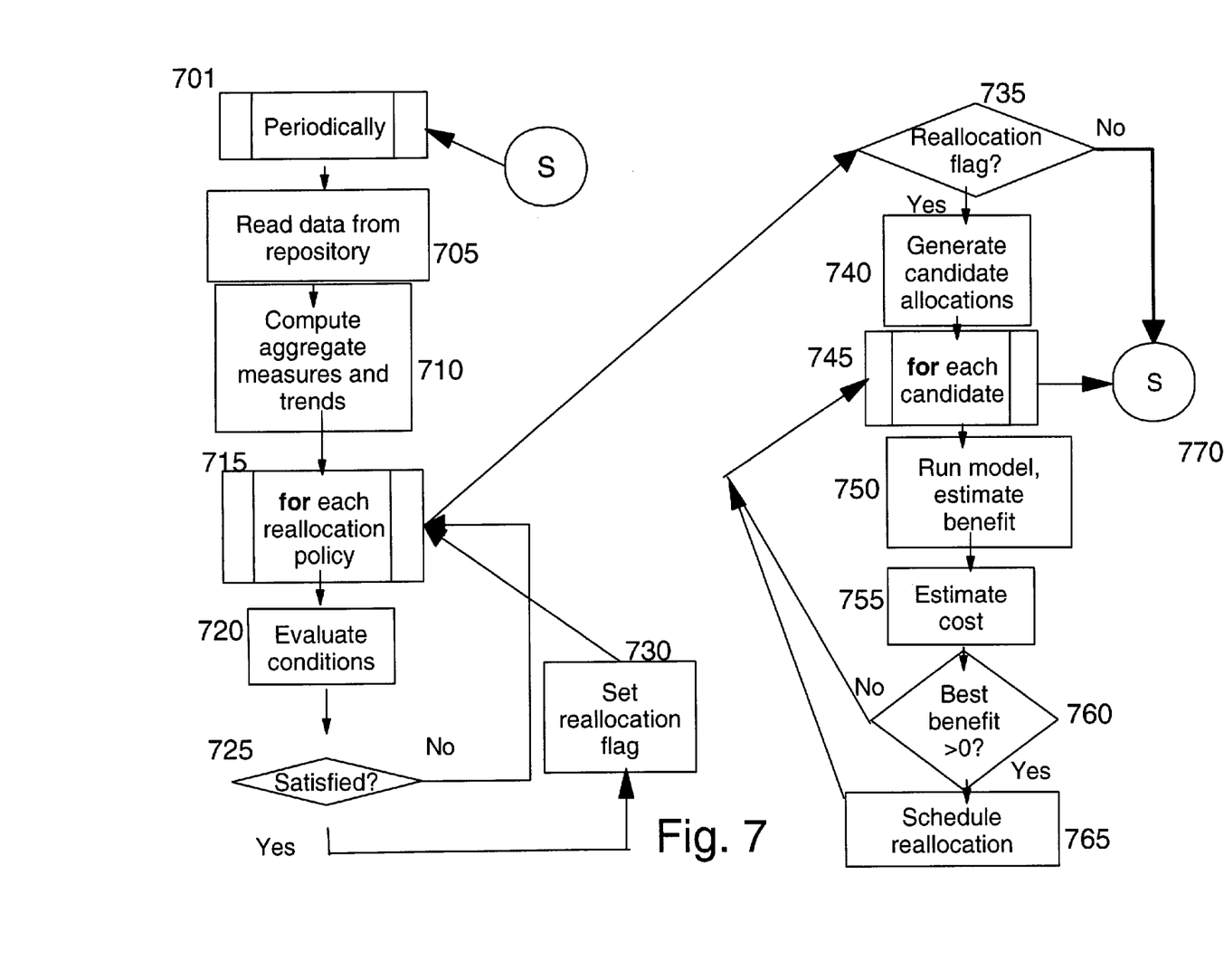
FIG. 7 shows an example of control flow for reallocation of storage.

FIG. 7 illustrates a logical flow of the reallocation step of a presently advantageous embodiment of this invention. Periodically (701), responsive to a timer or other trigger, which may occur in a time period ranging from a few seconds (e.g. less tan 3 seconds) to more than 10 minutes, the system reads (705) the data present in the performance-data repository and computes (710) one or more statistical measures from that data. For each (715) of its reallocation policies, it evaluates (720) that policy against the data read and/or the measures computed, and tests (725) whether or not the conditions of the policy are satisfied. If they are, it sets (730) a flag to indicate that reallocation is indicated. (In other embodiments of this invention, the system would at this step 730 also record other data about which policy was satisfied, how its conditions were satisfied, and similar data.) Once each reallocation policy has been evaluated, the system tests (735) to see if the reallocation flag has been set. If it has not, the system returns (701) to waiting for the next trigger event. If the reallocation flag has been set, the system generates (704) one or more possible new allocation arrangements for the storage objects in the system, using the data from the repository and methods known to the art. For each of those candidate new arrangements (745) the system evaluates its model of the storage system and estimates the benefit of the new arrangement, as well as estimating (750) the cost of putting the new allocations into effect. Once all the candidate arrangements have been evaluated, the system tests (760) whether or not the best new allocation would likely result in a net benefit, and if so, schedules (765) actions necessary to carry out the reallocation. In either case, the system then returns (701) to waiting for the next trigger event.

Figure 8:
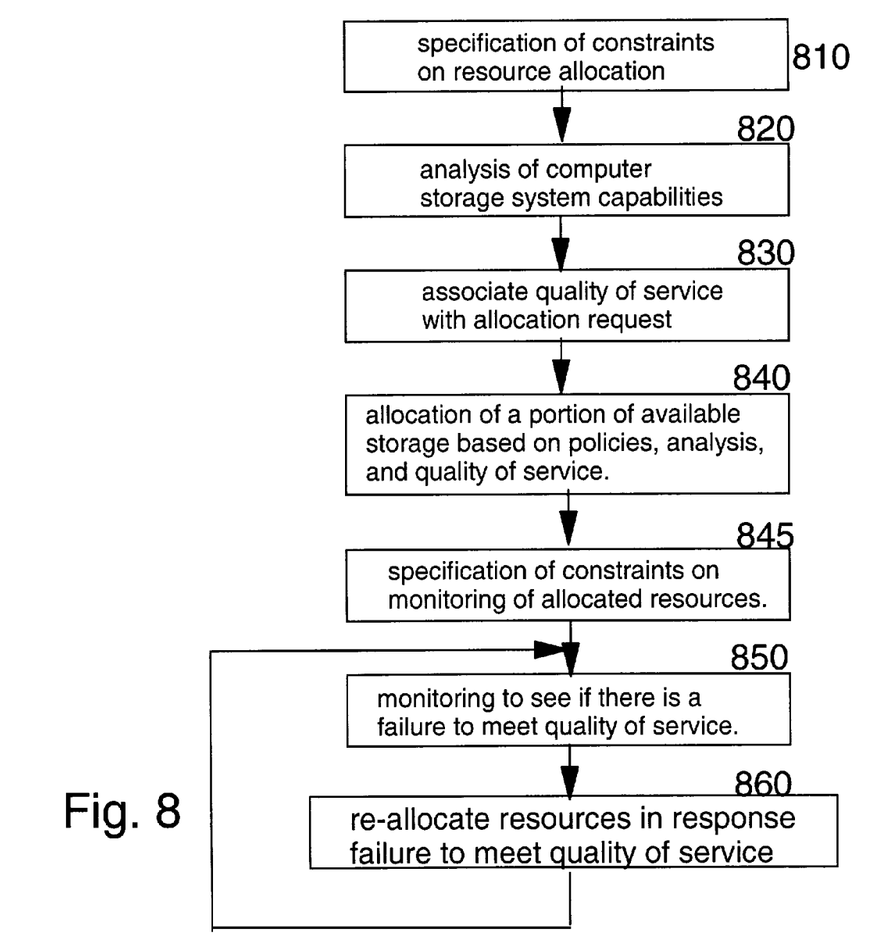
FIG. 8 shows an example of control flow for an alternate embodiment of the present invention.

Thus the present invention provides a method for allocating storage in a computer storage system. In an example embodiment, as shown in FIG. 8, the method includes the steps of: specifying policies as constraints on resource allocation in said computer storage system 810; analyzing capabilities of the computer storage system and forming analysis results 820; associating an allocation request with a given quality of service 830; allocating a portion of available storage in the computer storage system based on at least one policy in said constraints, the analysis results and the quality of service 840; specifying monitoring policies as constraints on monitoring delivered quality-of-service 845; monitoring the computer storage system in forming a determination that there is a failure to meeting the quality-of-service 850; reallocating resources in response to the determination that there is a failure to meeting the quality-of-service 860; and repeating the steps of monitoring 850 and reallocating 860 steps for the life of the storage allocation.

In varying embodiments of the method: the constraints are selected from a group of constraints consisting of: a quality-of-service selection for certain users; a quality-of-service for applications, and a quality-of-service selection for certain usage patterns, or in the form of constraints upon when and how resources may be allocated, or any combination of these.

In some cases, the step of specifying constraints includes the steps of: specifying a series of attributes for the quality-of-service, including maximum size, throughput, and response times required, and expected ratio of sequential and random accesses. Those skilled in the art can extend this list to include other performance attributes such as read-write ratios, availability requirements such as the level of redundancy (e.g. RAID 10), and security requirements such as badge-access only physical security for the storage subsystems. In some cases, the step of analyzing capabilities of the computer storage system includes the steps of: determining the capacity, speed, and other capabilities of the system. Techniques for determining the data storage capacity of computer storage systems are well-known to those skilled in the art. The speed of a computer storage system has many aspects—for example, throughput, latency, seek time, and so on. These capabilities can be determined automatically by having the computer storage system perform a range of sample workloads, and analyzing the results. Alternatively, the speed capabilities of the computer storage system can be provided to the system manually, based on information obtained from the manufacturer or from the computer storage system's documentation. In some cases, the step of forming analysis results includes the steps of: building a logical model of the storage infrastructure based on the configuration information collected via sensors at the time of system initialization, where the logical model includes information such as the storage space available, whether disks are configured in a RAID format, how many physical paths exist from storage subsystem to the host, and how the physical storage is mapped into the operating system supported data access abstractions (i.e. logical volumes); determining the capabilities of the storage system in terms of the levels of performance, availability, and security it can offer, what are the present commitments in terms of these quality of service criteria, and how to go about configuring the system to deliver desired level of quality-of-service. An example is determining that three storage RAID arrays exist each with 200 MB/s, 80 MB/s, and 50 MB/s throughput availability, that the third array has been completely committed to serving previous allocations, and that the first and second arrays are available on an IBM FastT storage subsystem via a McData switch: In some cases, the step of associating an allocation request with a given quality of service includes the steps of: comparing the incoming allocation request with the various available quality of service groups, using the results of the analysis steps above, and matching the allocation request with the most appropriate quality of service grouping. This match can be performed in many ways. An example matching would be to distribute allocation requests among available containers in a round-robin fashion. Even more specifically, referring to the example from the previous step, since both the first and second RAID arrays can accommodate the new allocation request, as an example embodiment, the allocation request is satisfies using the second RAID array because the round-robin scheme currently suggests using that particular array.

In some cases, the step of allocating a portion of available storage in the computer includes the steps of: examining, possibly based on the results of the step of analyzing the capabilities of the computer storage system, possibly also conjunction with the allocation request and the quality of service associated with the allocation request, the computer storage system selecting, based on some appropriate algorithm, the best way in which to utilize part of the computer storage system to meet the allocation request.

Numerous allocation algorithms exist, any number of which may be suitable (to a greater or lesser extent) to fulfill a particular allocation request at a particular time for a given computer storage system. For example, an algorithm sometimes known as 'best space fit' would select the smallest available (whilst still being larger the storage requested by the allocation request) piece of free storage on the computer system, and allocating the storage therein. Another algorithm, known as 'stripe and mirror everywhere' would spread the storage requested by the allocation request as widely as possible over the media available in the computer storage system. Yet a further algorithm, which we will refer to as 'best throughput fit' will place the storage allocated in response to the allocation request on the piece of computer storage system with the least available throughput (whilst still being able to meet or exceed the throughput requirements earlier associated with the allocation request). Other candidate allocation algorithms will be known and evident to those skilled in the art.

In some cases, the step of monitoring the computer storage system includes the steps of: observing (monitoring) various attributes of the computer storage system—for example, in one embodiment of the invention, all attributes of the computer storage system which are used by quality of service specifications are monitored.

In some cases, the step of forming a determination that there is a failure to meet the quality-of-service includes the steps of: examining the results of the above monitoring and comparing those results against the quality of service associated with each piece of allocated storage. In order to monitor each piece of allocated storage to ensure that it is performing acceptably (that is to say, is performing so as to meet the quality of service assigned in the quality of service assigning step), all attributes relevant to each piece of storage's quality of service must be observed, and checked against the attributes in the corresponding quality of service, and/or the step of reallocating resources includes the steps of: determining, via a process similar or identical to that used in the allocation step, a location on the computer storage system to which to relocate the piece of storage that is currently failing to meet its quality of service (as determined by the determination step), moving the piece of storage in question to the new location on the computer storage system. Those skilled in the art will be aware of several techniques for performing this relocation—'flashcopy' is one such technique, wherein the storage is relocated without the knowledge or assistance of the application or client using the storage. Other techniques are less automated, and may involve the cooperation of the client.

In some cases, the steps of associating and allocating employ a quality-of-service specification in a policy specification comprising performance specifications.

In some cases, the performance specifications includes a specification taken from a group of specifications consisting of: throughput, response time, transfer rate, or any combination of these; and/or the steps of associating and allocating employ a quality-of-service specification in a policy specification comprising availability specifications; and/or the availability specifications includes a specification taken from a group of specifications consisting of: storage system up time or error rate; and/or the steps of associating and allocating employ a quality-of-service specification in a policy specification comprising space specifications; and/or the space specifications includes a specification taken from a group of specifications consisting of: maximum size, initial size, size increments, guaranteed size or any combination of these; and/or the step of allocating employs a policy specification comprising specifying when and how allocated resources are reallocated in the step of reallocating; and/or further comprises the step of creating at least one standard named quality-of-service specifications; and/or further comprises the step of employing said least one standard named quality-of-service specifications to specify the desired quality of service in the step of allocating.

Thus the present invention may also be implemented by an apparatus for allocating storage in a computer storage system, the apparatus comprising: means for specifying constraints on resource allocation in said computer storage system; means for analyzing capabilities of the computer storage system and forming analysis results; means for associating an allocation request with a given quality of service; means for allocating a portion of available storage in the computer storage system based on at least one policy in said constraints, the analysis results and the quality of service; means for monitoring the computer storage system in forming a determination that there is a failure to meeting the quality-of-service; and means for reallocating resources in response to the determination that there is a failure to meeting the quality-of-service.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for allocating storage in a computer storage system, the method comprising:

specifying constraints on resource allocation in said computer storage system including specifying a set of attributes for the quality-of-service;

analyzing available capabilities of the computer storage system and generating analysis results from said analyzing that includes building a logical model of a storage infrastructure based on configuration information collected via sensors at the time of system initialization;

associating an allocation request with a given quality-of-service;

allocating a portion of available storage in the computer storage system based on the allocation request, at least one policy in said constraints, the analysis results, the quality-of-service associated with the allocation request and the logical model;

monitoring the computer storage system to determine whether the allocating of the portion of available storage in response to allocation request fails to meet the quality-of-service; and reallocating resources in response to the determination that the portion of the available storage fails to meet the quality-of-service associated with the allocation request, wherein said reallocating includes reading and processing data derived from dynamic sensors.

2. A method as recited in claim 1, wherein the step of specifying constraints on resource allocation includes specifying at least one constraint from a group of constraints consisting of: a quality-of-service selection for users; a quality-of-service for applications, quality-of-service patterns, when and how resources may be allocated.

3. A method as recited in claim 1, wherein the attributes of the set of attributes are selected from a group of attributes consisting of: maximum size; throughput; required response time; expected ratio of sequential and random accesses; read-write ratios; availability requirements; level of redundancy; security requirements; and any combination of these.

4. A method as recited in claim 1, wherein the step of analyzing capabilities of the computer storage system and generating analysis results includes selecting a capability from a group of capabilities consisting of: capacity; speed; throughput, latency, seek time, and any combination of these.

5. A method as recited in claim 1, wherein the logical model includes information selected from groups of information consisting of: storage space availability; configuration format; number of physical paths existing from a storage subsystem to a host; logical volumes; mapping of physical storage; and any combination of this information; and
wherein the capabilities of the storage system include at least one capability selected from a group of storage system levels of performance; storage system security; present commitments in terms of quality-of-service criteria; and system configuration methodology to deliver a particular level of quality-of-service; and any combination of these capabilities.

6. A method as recited in claim 5, wherein the step of analyzing capabilities includes determining whether three storage RAID arrays exist respectively having 200 MB/s, 180/MB/s, and 20 MB/d throughput availability, and whether the third array has been completely committed to serving previous allocations, and whether the first and second arrays are available on an IBM FastT storage subsystem via a McData switch.

7. A method as recited in claim 1, wherein the step of associating an allocation request with a given quality-of-service includes: selecting the quality-of-service level from at least one of: a previously defined quality-of service levels; storage based on observed usage of allocated storage; management software based on business level policies and service level agreements; any combination of these.

8. A method as recited in claim 1, wherein the step of allocating a portion of available storage in the computer includes selecting a best throughput fit way of utilizing at least part of the computer storage system to meet the allocation request based on said analysis results.

9. A method as recited in claim 1, wherein the step of monitoring the computer storage system includes observing various attributes of the computer storage system.

10. A method as recited in claim 1, wherein the step of monitoring the computer storage system to determine whether the allocating fails to meet the quality-of-service includes the steps of:
examining results generated by the steps of monitoring; and
comparing the examined monitoring results to a particular quality of service associated with each allocated portion of said available storage.

11. A method as recited in claim 1, wherein the step of reallocating resources includes the steps of:

determining a new location on the computer storage system to relocate a piece of storage currently that failed to meet the quality-of-service; and
storing the piece of storage in the new location on the computer storage system.

12. A method as in claim 1, wherein the steps of associating and allocating employ a quality-of service specification in a policy specification comprising performance specifications.

13. A method as in claim 12, wherein the performance specifications includes a specification taken from a group of specifications consisting of: throughput, response time, transfer rate, and any combination of these.

14. A method as in claim 1, wherein the steps of associating and allocating employ a quality-of-service specification in a policy specification comprising availability specifications.

15. A method as in claim 14, wherein the availability specifications includes a specification taken from a group of specifications consisting of: storage system up time and error rate.

16. A method as in claim 1, wherein the steps of associating and allocating employ a quality-of-service specification in a policy specification comprising space specifications.

17. A method as in claim 16, wherein the space specifications includes a specification taken from a group of specifications consisting of: maximum size, initial size, size increments, guaranteed size and any combination of these.

18. A method as in claim 1, wherein the step of allocating employs a policy specification comprising specifying when and how allocated resources are reallocated in the step of reallocating.

19. A method as in claim 2, further comprising creating at least one standard named quality-of service specifications.

20. A method as in claim 19, further comprising employing said at least one standard named quality-of-service specifications to specify the desired quality-of-service in the step of allocating.

21. A method for allocating storage in a computer storage system, the method comprising:
a policy specification step, wherein constraints on resource allocation are specified; the constraints being in a form of quality-of-service selection for certain users, applications, and patterns, and/or in a form of constraints upon when and how resources may be allocated including specifying a set of attributes for the quality-of-service;
a resource-analysis step, wherein available capabilities of the storage system are analyzed, and results of an analysis are saved that includes building a logical model of a storage infrastructure based on configuration information collected via sensors at the time of system initialization;
a quality-of-service specification step, wherein an allocation request is associated with a given quality-of-service;
an allocation step, wherein at least some available storage in the computer storage system is allocated based on the allocation request, on policies specified in the policy specification step, responsive to the analysis results saved in the resource-analysis step including the logical model, the quality-of-service specified in the quality-of-service specification step; and
a reallocation step, wherein resources may be reallocated in response to monitoring of the computer system that shows failure of meeting the given quality-of-service, including reading and processing data derived from dynamic sensors.

* * * * *